United States Patent [19]
Cooper

[11] Patent Number: 5,941,502
[45] Date of Patent: Aug. 24, 1999

[54] ELECTRIC VALVE ASSEMBLY AND METHOD OF MAKING SAME

[76] Inventor: Robert J. Cooper, 304 S. 3rd St., West Dundee, Ill. 60118

[21] Appl. No.: 08/741,458

[22] Filed: Oct. 31, 1996

[51] Int. Cl.⁶ .................................................. F16K 31/06
[52] U.S. Cl. ...................................... 251/129.15; 335/260
[58] Field of Search ........................... 251/129.15, 30.03, 251/38, 45; 335/260, 262

[56] References Cited

U.S. PATENT DOCUMENTS

| | | | |
|---|---|---|---|
| 3,011,751 | 12/1961 | Delany et al. | 251/45 X |
| 3,154,285 | 10/1964 | Houle | 251/38 X |
| 3,917,218 | 11/1975 | Marocco | 251/38 X |
| 4,967,996 | 11/1990 | Sonoda et al. | 251/45 X |
| 5,299,592 | 4/1994 | Swanson | 251/129.15 X |
| 5,358,215 | 10/1994 | Buth et al. | 251/129.15 X |

*Primary Examiner*—Kevin Lee
*Attorney, Agent, or Firm*—Terrence Martin; Jules Jay Morris; David Barron

[57] ABSTRACT

A solenoid actuated valve has a magnetic armature slidably received in a closed guide member secured to the valve body by a spin welded ring. The armature guide has external peripheral teeth which interengage corresponding internal teeth on the solenoid coil assembly to permit any desired rotational orientation of the coil when assembled onto the guide. The coil assembly is secured in the desired rotational position by interengagement of the teeth and is secured axially by snap tabs formed on the end of the guide.

14 Claims, 3 Drawing Sheets

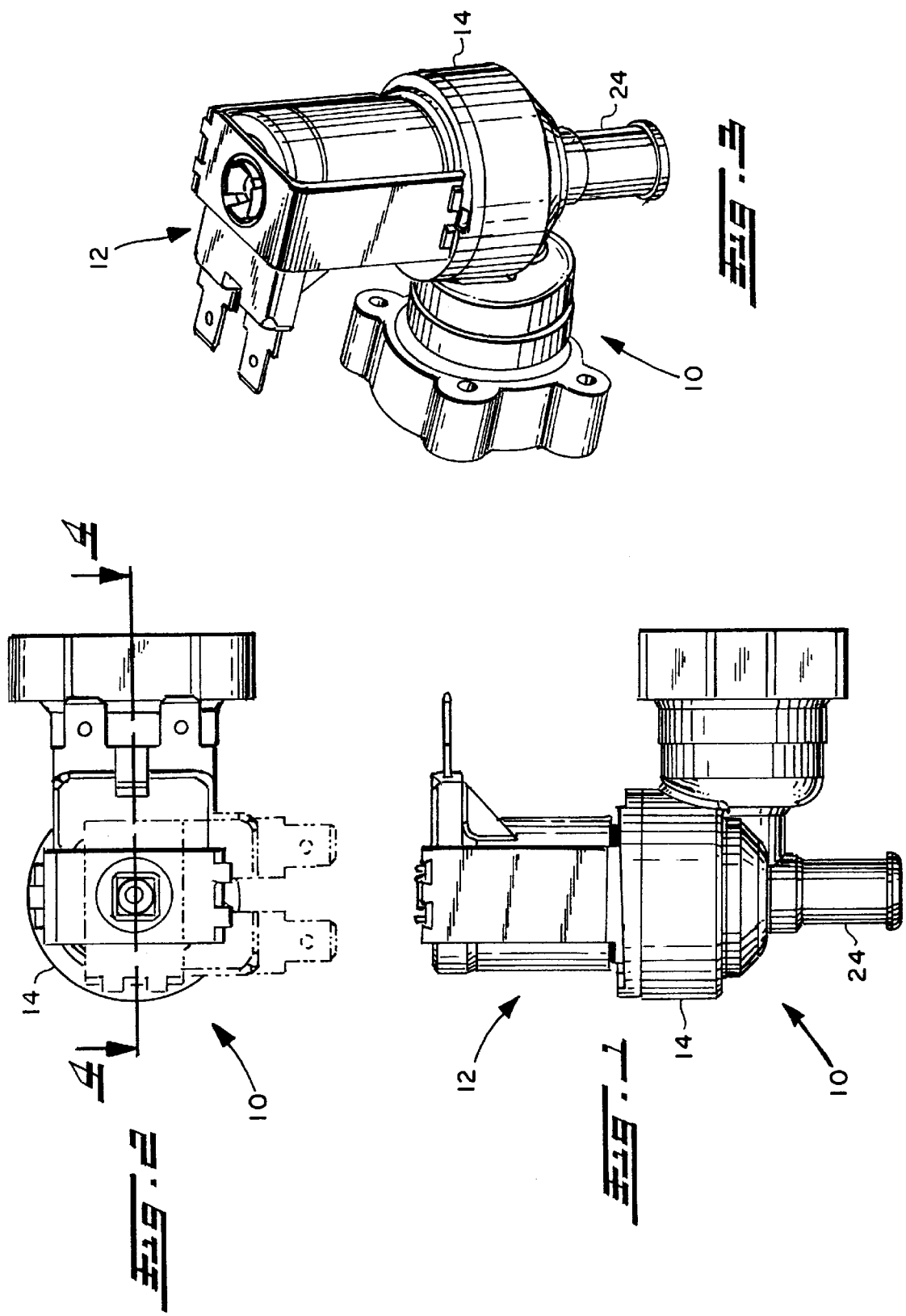

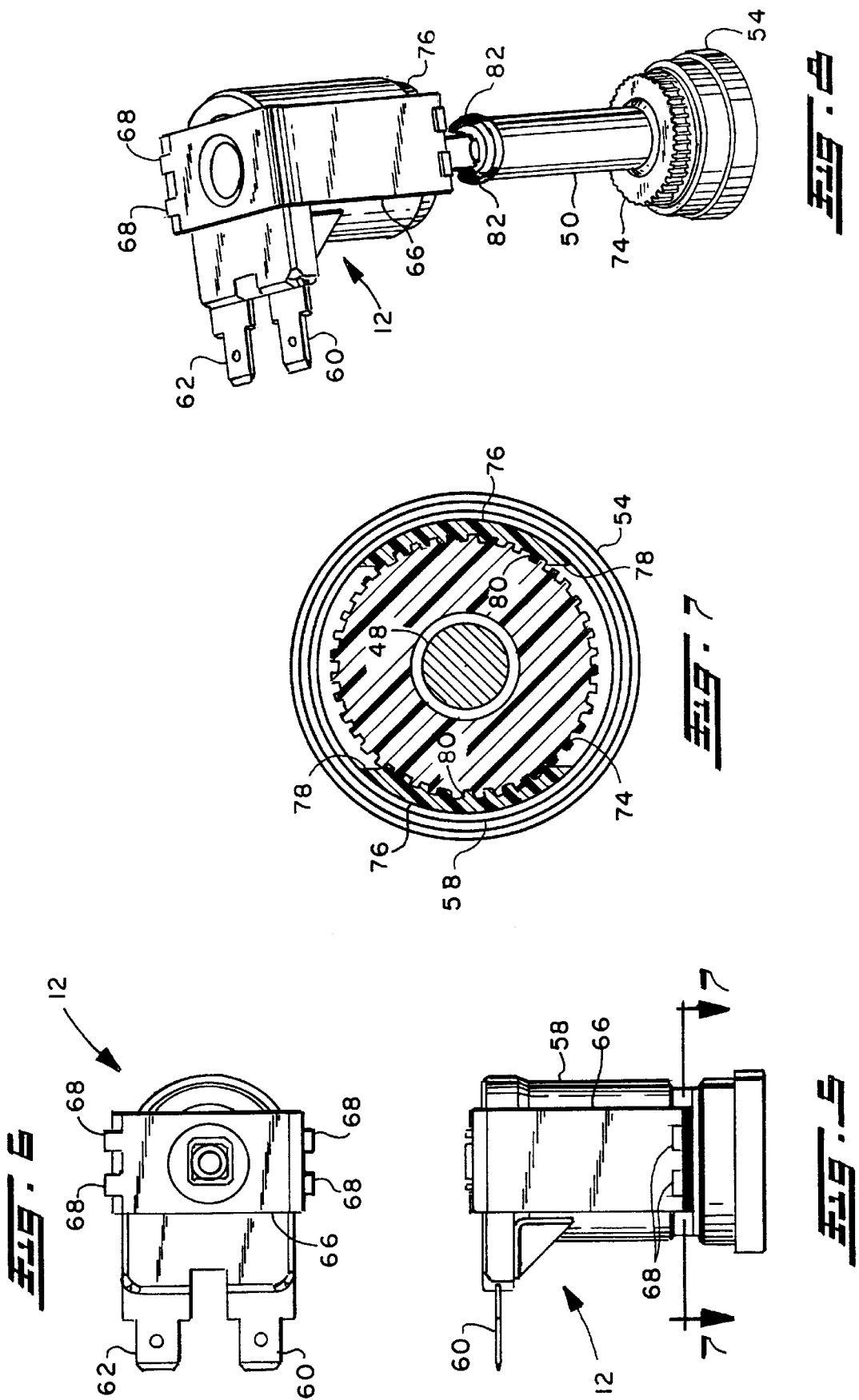

5,941,502

ELECTRIC VALVE ASSEMBLY AND METHOD OF MAKING SAME

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to techniques for manufacturing and assembling an electrically actuated valve assembly and particularly to such a valve assembly utilizing a solenoid operator. In particular, the invention relates to solenoid actuated valve of the type having a relatively small low-current solenoid actuator for moving a pilot operator to effect opening of the valve. Solenoid actuated pilot operated valves of the aforesaid type are commonly employed as water inlet valves for programmable appliances such as automatic clothes washing machines, and automatic dishwashing machines.

Electrically operated water inlet valves for automatic dishwashers and washing machines typically are attached to the appliance cabinet or housing and have provisions provided thereon for attachment of a water supply hose to the inlet from the exterior of the appliance cabinet; and, the valve outlet is connected to a hose or tube interiorly of the appliance cabinet or housing and the solenoid electrical terminals are connected to a wiring harness within the appliance cabinet. In the manufacture of the aforesaid appliances, it is necessary to properly orient the solenoid coil connecting terminals in order that there will be sufficient clearance between the terminals and the cabinet to permit the connection of the wiring harness to the solenoid connector terminals.

Where it is desired to provide a common valve for different models or configurations of appliances having different cabinet configuration and requiring different arrangements of the valve inlet and the electrical connector terminals, it has been found difficult to provide for variations in the orientation of the solenoid connector terminals with respect to the valve ports without requiring retooling of the valve for each orientation desired for the coil terminals with respect to the valve ports. This is particularly a problem where the valve body is mass produced in high quantities by injection molding of thermoplastic material with the solenoid coil assembly attached to the valve body in a permanently fixed orientation of the solenoid connector terminals with respect to the body. Alterations in the orientation of the solenoid with respect to the valve body have proven to be costly and have required different tooling for manufacturing the body and the solenoid components. It has thus been desired to find a way or means of providing for varying the orientation of the solenoid coil assembly onto the valve body of an appliance water inlet valve in a manner which may be varied after the assembly of the valve is complete and which does not require changes in tooling for the manufacture of the component parts of the valve.

BRIEF SUMMARY OF THE INVENTION

It is an object of the present invention to provide a simple and low cost way of permitting variations in the orientation of a solenoid coil assembly onto a valve body to permit different orientations of the solenoid connector terminals with respect to the valve ports in the body. It is an object of the present invention to provide for readily changing the orientation of the solenoid connector terminals with respect to the ports of the valve body to which the solenoid has been attached during assembly of the valve.

It is an object of the present invention to provide a low cost technique for altering the orientation of the solenoid electrical connector terminals with respect to the body of a valve in a manner which may be performed after assembly of the moveable components of the valve and which requires no tooling to change the orientation.

The present invention employs an encapsulated coil solenoid sub assembly having a plurality of teeth molded about the periphery of one end of the coil encapsulation which engage a corresponding plurality of teeth formed on the armature guide of the valve upon which the coil is assembled. The solenoid coil is oriented over the armature guide of the valve in the desired arrangement and the solenoid is frictionally engaged with the armature guide and moved axially to engage corresponding teeth on the guide for securing the coil in position at the desired rotational orientation. The orientation of the solenoid coil terminals may be changed after assembly by a slight axial movement to disengage the teeth and reorienting the coil terminals and reengaging the teeth by axial movement of the coil over the guide with resilient lugs provided on the guide for retaining the coil axially in the selected orientation.

BRIEF DESCRIPTION OF THE DRAWINGS

FIG. 1 is a side elevation view of the assembled valve of the present invention;

FIG. 2 is a top view of the valve of FIG. 1;

FIG. 3 is an axonometric view of the valve of FIG. 1 taken from the left;

FIG. 5 is a side elevation view of the solenoid coil assembly for the valve of FIG. 1;

FIG. 6 is a top view of the coil assembly of FIG. 5;

FIG. 7 is a section view taken along section indicating lines 7—7 of FIG. 5; and, FIG. 8 is an exploded view of the coil assembly of FIG. 5.

DETAILED DESCRIPTION OF THE INVENTION

Figure 4:
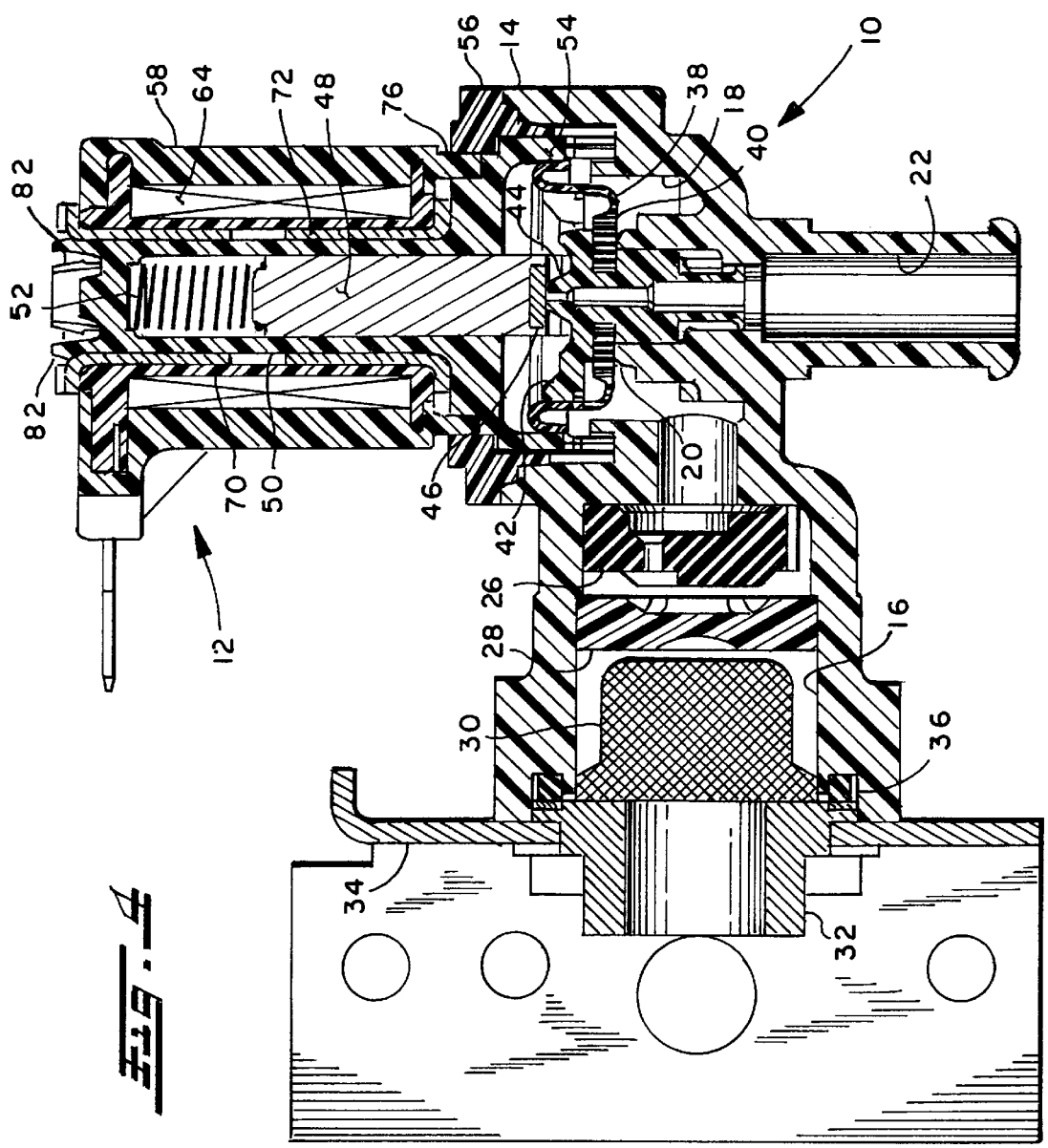
FIG. 4 is a section view taken along section indicating lines 4—4 of FIG. 2 and shows a mounting bracket and fitting installed.

Referring to FIGS. 1 through 4, the valve assembly of the present invention is indicated generally at 10 and includes a solenoid actuator indicated generally at 12 which is attached to a body 14 having an inlet passage 16 communicating with a valving chamber 18 which has formed therein a valve seat 20 which communicates with an outlet passage 22 formed in an outlet fitting 24. Inlet passage 16 preferably includes a resiliently compressible flow control washer 26 and a retainer 28 and filter screen 30 which is retained by an inlet fitting 32 secured to the body by mounting bracket 34 and sealed thereagainst by a resilient seal ring 36.

A moveable valve member preferably a flexible diaphragm 38 with a thickened center portion 40 comprising a valving pad is disposed in the valving chamber 18 and the pad 40 is moveable for contacting or opening and closing against valve seat 20. The pad portion 40 of diaphragm 38 has a rigid insert 42 received therethrough which has formed therein a pilot valve seat 44 which communicates with outlet passage 22 through a reduced diameter pilot passage 43. A pilot valving member 46 is disposed to seat against the valve seat 44 and is retained on the end of a ferromagnetic armature 48 which is slidably disposed in a tubular guide 50 formed of nonmagnetic material preferably thermoplastic material; and, armature 48 is biased into contact with the valve seat 44 by a spring 52 which is registered against the undersurface of the closed upper end of guide 50. The lower end of guide 50 has an enlarged diameter flange or bell mouth portion 54 integrally formed thereon which is received in body 14 and seals the outer peripheral rim of diaphragm 38 in the body. The enlarged diameter flange 54 of the armature guide tube 50 is retained in the body by an annular retaining member or ring 56 which, in the presently preferred practice is formed of thermoplastic material as is body 14; and, ring 56 is preferably secured to the body by weldment such as by spin welding.

Referring to FIGS. 5 through 8, the solenoid coil assembly 12 is shown as including an encapsulated coil 58 having electrical terminals 60, 62 for external electrical connection thereto which terminals 60, 62 are oriented in spaced parallel relationship and extended generally right angles to the axis of the coil. The coil is denoted by reference numeral 64 in FIG. 4. A ferromagnetic pole frame 66 is disposed about the coil and is preferably formed by two right angle members having interlocking tabs 68 formed in diagonally opposite corners of the frame formed thereby.

Referring to FIGS. 4, 7 and 8, the pole frame 66 has formed integrally therewith tubular flanges 70, 72 which extend inwardly of the coil from the axially opposite ends thereof and which form an air gap therebetween.

Referring to FIGS. 7 and 8, the armature guide has at least one, and preferably a plurality of, positionally engagement surfaces formed thereon which in the presently preferred practice comprise a plurality of teeth 74 spaced peripherally about the flange 54.

The lower portion or rim 76 of the encapsulation 58 of coil assembly 12 has a pair of oppositely disposed slots 78 formed for receiving therethrough the lower cross member of the pole frame 66. The remaining portion of the rim 76 of the coil encapsulation has corresponding engagement surfaces 78 formed on the inner periphery thereof and which comprise teeth 80 which interdigitate with teeth 74 on the armature guide.

The upper end of the armature guide tube 50 has at least one and preferably a plurality of snap engaging surfaces comprising tabs 82 formed thereon which are adapted to be resiliently radially compressed for assembly of the interior of the pole tubes 70, 72 thereover. The upper end of the guide tube extends through the pole tubes and the tabs 82 are permitted to deform slightly radially inwardly during assembly and return to their undeformed position as shown in FIG. 4 to retain the coil assembly 12 onto the armature guide tube 50. It will be understood that, as the coil assembly 12 is axially assembled onto the armature guide tube 50, the coil is rotationally positioned to the desired orientation of the terminals 60, 62 and the teeth 74, 80 are engaged as the coil is assembled axially onto the guide tube 50 and is retained axially thereon by tabs 82 and is thus rotationally locked in the desired position by the teeth 74, 80.

The present invention thus provides a unique and novel way of orienting the solenoid coil with respect to a valve body of a solenoid operated valve upon assembly of the coil over the armature guide tube attached to the body and permits the coil to be oriented in any rotational position desired and secured in the selected position by engagement of corresponding engaging surfaces provided on the interior of the coil assembly encapsulation and the exterior of the armature guide. In the illustrated embodiment, the engaging surfaces are a plurality of spaced peripheral teeth; however, it will be understood that the engagement surfaces may comprise any convenient shape, as for example, a single notch and projecting lug or polygonally-shaped interengaging surfaces or any other desired geometrical configuration.

Although the invention has hereinabove been described with respect to the illustrated embodiments, it will be understood that the invention is capable of modification and variation and is limited only by the spirit and scope of the following claims.

I claim:

1. A method of making an electrically operated valve assembly comprising:

(a) forming a valve body having an inlet, outlet, a valving chamber therebetween, and a valve member moveable for controlling flow from inlet to outlet;

(b) disposing an armature and said valve member within a guide member for movement therein and forming at least one engagement surface exteriorly on said guide member;

(c) initially attaching and sealing said guide member on said body over said armature and valve member;

(d) subsequently disposing and orienting a solenoid coil over said guide in a desired orientation and engaging said coil with said at least one engagement surface and securing said orientation; and, (e) retaining said coil on said guide in said orientation, wherein said attaching step includes spin welding an annular member onto said body.

2. The method defined in claim 1, wherein said step of forming at least one engagement surface on said guide member includes molding a plurality of teeth.

3. An electrically actuated valve assembly comprising:

(a) a body defining an inlet, an outlet, a valving chamber therebetween, and a valve seat between the inlet and outlet and including a valve member moveable with respect to said valve seat and an armature moveable for effecting movement of said valve member;

(b) a guide member secured to said body for sealing said chamber and for guiding movement of said armature, said guide member having at least one positional orienting toothed surface formed thereon;

(c) retaining means operative to attach and seal said guide member on said body;

(d) an electromagnetic operator assembly including a coil and pole piece with said coil received over said guide member and said operator assembly having locating surfaces thereon for receiving and engaging said at least one orienting toothed surface and rotationally positioning said coil on said body; and, (e) retaining means on said guide member operable to engage and retain said operator assembly in said rotational position on said guide.

4. The valve assembly defined in claim 3, wherein said guide member is disposed centrally within said coil and said retaining means includes deflectable tabs on said guide.

5. The valve assembly defined in claim 3, wherein said coil is encapsulated in thermoplastic material and said pole piece comprises a ferromagnetic frame over said encapsulation; and, said orienting surface comprise a plurality of teeth formed in said thermoplastic material.

6. The valve assembly defined in claim 3, wherein said certain orienting surface and said locating surfaces each comprise a plurality of peripherally disposed interengaging teeth.

7. The valve assembly defined in claim 3, wherein said retaining means comprises an annular member received over said guide member secured to said body by weldment.

8. An electrically actuated valve assembly comprising:
   (a) a body defining an inlet, an outlet, a valving chamber therebetween, and a valve seat between the inlet and the outlet and including a valve member moveable with respect to said valve seat and an armature moveable for effecting movement of said valve member;
   (b) a guide member secured to said body for sealing said chamber and for guiding movement of said armature, said guide member having at least one positional orienting surface formed thereon;
   (c) retaining means operative to attach and seal said guide member on said body;
   (d) an electromagnetic operator assembly including a coil and a pole piece with said coil received over said guide member and said operator assembly having locating surfaces thereon for engaging said at least one orienting surface and rotationally positioning said coil on said body; and
   (e) retaining means on said guide member operable to engage and retain said operator assembly in said rotational position on said guide;
   wherein said guide member is disposed centrally within said coil and said retaining means includes deflectable tabs on said guide.

9. An electrically actuated valve assembly comprising:
   (a) a body defining an inlet, an outlet, a valving chamber therebetween, and a valve seat between the inlet and the outlet and including a valve member moveable with respect to said valve seat and an armature moveable for effecting movement of said valve member;
   (b) a guide member secured to said body for sealing said chamber and for guiding movement of said armature, said guide member having at least one positional orienting surface formed thereon;
   (c) retaining means operative to attach and seal said guide member on said body;
   (d) an electromagnetic operator assembly including a coil and a pole piece with said coil received over said guide member and said operator assembly having locating surfaces thereon for engaging said at least one orienting surface and rotationally positioning said coil on said body; and
   (e) retaining means on said guide member operable to engage and retain said operator assembly in said rotational position on said guide;
   wherein said coil is encapsulated in plastic resin material and said pole piece comprises a ferromagnetic frame over said encapsulation, and said orienting surfaces comprise a plurality of teeth formed in said plastic resin material.

10. An electrically actuated valve assembly comprising:
    (a) a body defining an inlet, an outlet, a valving chamber therebetween, and a valve seat between the inlet and the outlet and including a valve member moveable with respect to said valve seat and an armature moveable for effecting movement of said valve member;
    (b) a guide member secured to said body for sealing said chamber and for guiding movement of said armature, said guide member having at least one positional orienting surface formed thereon;
    (c) retaining means operative to attach and seal said guide member on said body;
    (d) an electromagnetic operator assembly including a coil and a pole piece with said coil received over said guide member and said operator assembly having locating surfaces thereon for engaging said at least one orienting surface and rotationally positioning said coil on said body; and
    (e) retaining means on said guide member operable to engage and retain said operator assembly in said rotational position on said guide;
    wherein said retaining means comprises an annular member received over said guide member secured to said body by weldment.

11. The valve assembly as defined in claim 8, wherein said orienting surfaces and said locating surfaces each comprise a plurality of peripherally disposed interengaging teeth.

12. The valve assembly as defined in claim 9, wherein said orienting surfaces and said locating surfaces each comprise a plurality of peripherally disposed interengaging teeth.

13. The valve assembly as defined in claim 10, wherein said orienting surfaces and said locating surfaces each comprise a plurality of peripherally disposed interengaging teeth.

14. A method of making an electrically operated valve assembly comprising:
    (a) forming a valve body having an inlet, an outlet, and a valve member moveable for controlling flow from inlet to outlet;
    (b) disposing an armature and said valve member within a guide member for movement therein and forming at least one engagement surface exteriorly on said guide member;
    (c) initially attaching and sealing said guide member on said body over said armature and valve member;
    (d) subsequently disposing and orienting a solenoid coil over said guide in a desired orientation and engaging said coil with said at least one engagement surface and securing said orientation; and
    (e) retaining said coil on said guide member in said orientation;
    wherein said attaching step includes welding an annular member onto said body.

* * * * *